United States Patent
Hamaguchi

(10) Patent No.: US 8,423,713 B2
(45) Date of Patent: Apr. 16, 2013

(54) CLUSTER TYPE STORAGE SYSTEM AND METHOD OF CONTROLLING THE SAME

(75) Inventor: Masaki Hamaguchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 345 days.

(21) Appl. No.: 12/922,715

(22) PCT Filed: Sep. 6, 2010

(86) PCT No.: PCT/JP2010/005473
§ 371 (c)(1),
(2), (4) Date: Sep. 15, 2010

(87) PCT Pub. No.: WO2012/032569
PCT Pub. Date: Mar. 15, 2012

(65) Prior Publication Data
US 2012/0059989 A1    Mar. 8, 2012

(51) Int. Cl.
*G06F 12/00* (2006.01)
(52) U.S. Cl.
USPC .......................................... 711/114; 711/173
(58) Field of Classification Search .................. 711/114, 711/173
See application file for complete search history.

(56) References Cited

U.S. PATENT DOCUMENTS

| | | | |
|---|---|---|---|
| 8,225,057 B1 * | 7/2012 | Zheng et al. | 711/162 |
| 2007/0038697 A1 * | 2/2007 | Zimran et al. | 709/203 |
| 2007/0220071 A1 * | 9/2007 | Anzai et al. | 707/204 |
| 2009/0063556 A1 | 3/2009 | Nemoto et al. | |
| 2009/0106255 A1 | 4/2009 | Lacapra et al. | |
| 2009/0276588 A1 | 11/2009 | Murase | |
| 2010/0114889 A1 * | 5/2010 | Rabii et al. | 707/737 |
| 2010/0191779 A1 | 7/2010 | Hinrichs | |

FOREIGN PATENT DOCUMENTS

| | | |
|---|---|---|
| EP | 1669850 A1 | 6/2006 |
| JP | 2009-059201 A | 3/2009 |

* cited by examiner

*Primary Examiner* — Hashem Farrokh
(74) *Attorney, Agent, or Firm* — Volpe and Koenig, P.C.

(57) ABSTRACT

The present invention can adjust the ratio between a global namespace storage area and a local namespace storage area. Each of the nodes adjusts the ratio between GNS storage areas and LNS storage areas of logical volumes according to the operating condition. When received a LNS-based access request as an access request for storing business affair data from each client, each of the nodes store the business affair data in their own LNS storage areas. When received a GNS-based access request, the node checks the unused capacity of the GNS storage areas of each of the nodes, and transfers the business affair data via a network switch to the node which comprises a logical volume with the largest unused capacity.

10 Claims, 17 Drawing Sheets

| | | Y (GNS USAGE AMOUNT) 162 | |
|---|---|---|---|
| | | ABOVE THRESHOLD 166 | BELOW THRESHOLD 168 |
| Z (LNS USAGE AMOUNT) 164 | ABOVE THRESHOLD 170 | CHANGE IN VALUE a IMPOSSIBLE | VALUE a TO BE REDUCED |
| | BELOW THRESHOLD 172 | VALUE a TO BE INCREASED | NO FURTHER PROCESSING |

(table 160)

CLUSTER TYPE STORAGE SYSTEM AND METHOD OF CONTROLLING THE SAME

TECHNICAL FIELD

The present invention relates to a cluster type storage system which comprises a plurality of nodes for performing data input/output processing with respect to a storage device, as well as a method of controlling the same.

BACKGROUND ART

As a storage system, a cluster type storage system is known which comprises a plurality of nodes that function as controllers or file servers for performing data input/output processing with respect to storage devices which a disk array apparatus comprises, and in which cluster type storage system each node is connected via a network. In a storage system of this type, there exists technology which provides a client (client computer) with a global namespace (hereinafter also referred to as GNS) which is a virtualized simple namespace common to each node (see PTL 1).

Here, a plurality of clients, connected via a network to a cluster type storage system, are capable, by using a GNS, of accessing a single file system which is constructed in a storage system, for example, without knowing the names of the individual nodes. In such a case, if any of the plurality of nodes receives an access request from a client, the node which receives the access request checks the unused capacity of the storage area (logical volume) of each node from the standpoint of capacity distribution, and when its own unused capacity is maximum, accesses its own storage area, and when there is a node among the other nodes for which the unused capacity is maximum, selects a node among the other nodes in which data is to be stored, and transfers data via an internal network to the selected node.

CITATION LIST

Patent Literature

[PTL 1]
Japanese Patent Laid-Open Application Publication No. 2009-59201

SUMMARY OF INVENTION

Technical Problem

If a cluster type storage system is constructed each of clients can access any data in the system regardless of which node is accessed by issuing an access request by using GNS provided from each the nodes.

However, a node which had received an access request must check the unused capacity of the logical volumes (storage areas) of each of the nodes, which brings about a corresponding drop in the processing performance. Furthermore, when focusing on a specified node, for example when focusing on a node with large unused capacity of the logical volume, even if the load on the node (processor load) is high, the data is sometimes transferred from another node (a node with small unused capacity of a logical volume). Hence, the node with large unused capacity of the logical volume must, despite the heavy load, perform processing to receive data from other nodes, and hence it causes a corresponding drop in the processing performance in accordance with the data transferring.

The present invention was conceived in view of the problems with the prior art and an object thereof is to provide a cluster type storage system and control method thereof that divide storage area of a logical volume, which each of the nodes comprises and which is an access target of each of the clients, into a global namespace storage area used by a global namespace, and a local namespace storage area used by a local namespace, and that can adjust the ratio between the global namespace storage area and the local namespace storage area.

Solution to Problem

In order to achieve the above object, the present invention is configured such that each of the nodes, which execute data input/output processing with respect to a plurality of storage apparatuses, manages a logical volume as an access target of each of clients, in association with a global namespace which is provided to each of the clients as a single namespace shared by each of the nodes, and a local namespace provided to each of the clients as a namespace for specifying each of the nodes, manages storage areas of each of the logical volumes by dividing these storage areas into global namespace storage areas representing the access destination if the global namespace has been added to the access request, and into local namespace storage areas representing the access destination if the local namespace has been added to the access request, and takes the proportion of the capacity occupied by the global namespace storage areas against the overall capacity of each of the logical volumes as an adjustment target.

Advantageous Effects of Invention

According to the present invention, the ratio between the global namespace storage area and the local namespace storage area of the logical volume of each of the nodes can be adjusted.

DESCRIPTION OF EMBODIMENTS

[Concept of Invention]

Figure 1:
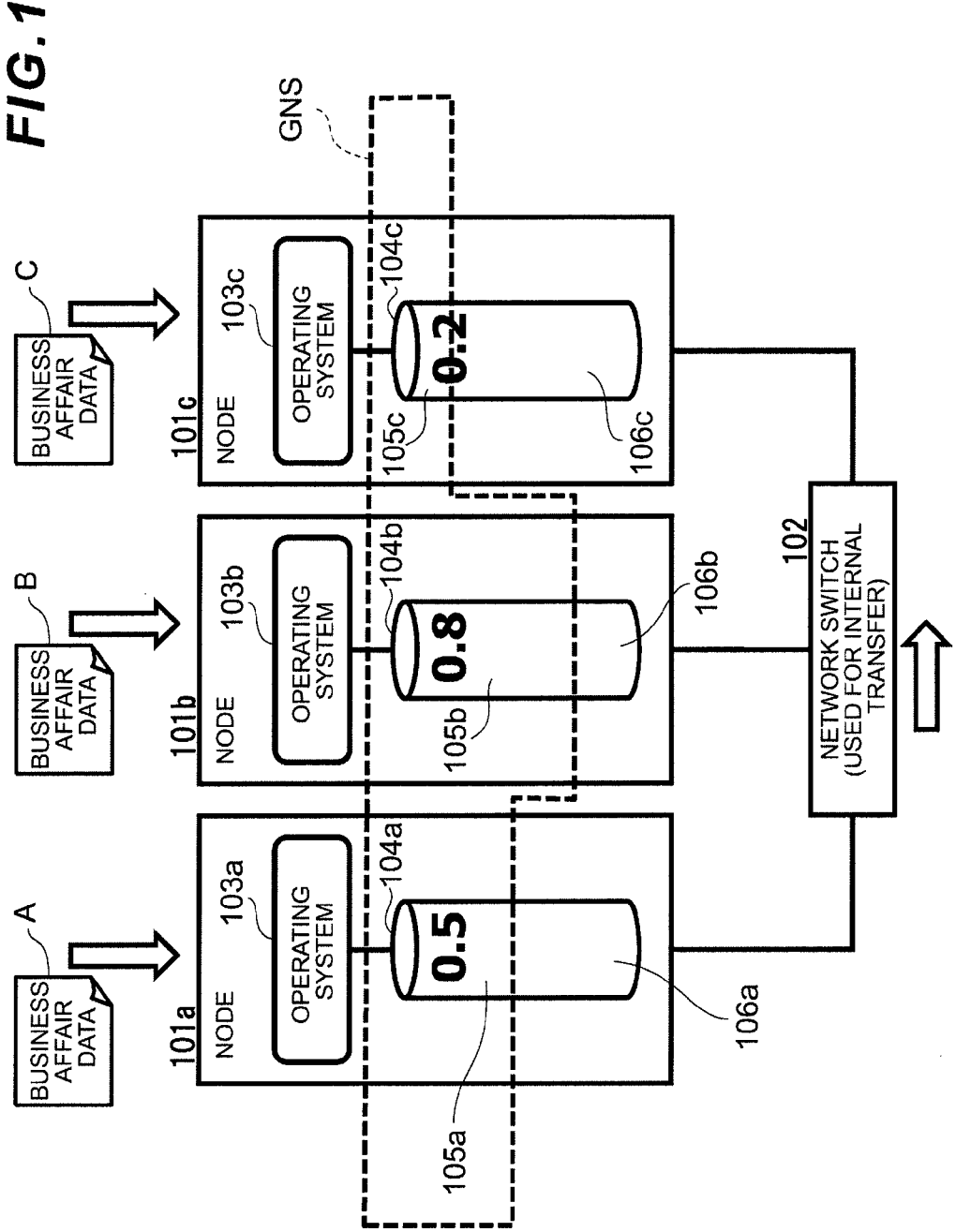
FIG. 1 is a conceptual view illustrating the concept of the present invention.

FIG. 1 is a conceptual view illustrating the concept of the present invention. In FIG. 1, the cluster type storage system comprises a plurality of nodes 101a, 101b, and 101c which function as controllers or file servers for input/output processing with respect to data stored in storage devices (not shown), and each node is connected via the network switch (internal network) 102.

The nodes 101a to 101c respectively comprise operating systems (OS) 103a to 103c for processing access requests from a plurality of clients (not shown), and logical volumes 104a to 104c which are access targets from each client and which are constructed in the storage areas of the storage devices.

Here, the nodes 101a to 101c each manage the logical volumes 104a to 104c in association with a global namespace (GNS) which is provided to each client as a single namespace common to each node, and a local namespace (hereinafter also referred to as an LNS) which is provided to each client as a namespace specifying each node, manages the storage areas of the logical volumes 104a to 104c by dividing these storage areas into GNS (global namespace) storage areas 105a to 105c which are access destinations in cases where a GNS is added to access requests from each client and into LNS (local namespace) storage areas 106a to 106c which are access destinations in cases where an LNS is added to access requests from each client, and adjusts the ratio between the GNS storage areas 105a to 105c and the LNS storage areas 106a to 106c.

For example, in a case where the proportion of GNS storage areas 105a to 105c (the proportion by which the GNS storage areas 105a to 105c occupy the overall storage area of each of the logical volumes 104a to 104c) is a ($0 < a < 1$), the proportion of the GNS storage area 105a of logical volume 104a is configured as a=0.5, the proportion of the GNS storage area 105b of the logical volume 104b is configured as a=0.8, and the proportion of the GNS storage area 105c of the logical volume 104c is configured as a=0.2.

Here, if, as an access request to store business affair data A, node 101a receives an LNS-based access request from a client, node 101a stores the business affair data A in an LNS storage area 106a in its own logical volume 104a. Likewise, if, as an access request to store business affair data B, node 101b receives an LNS-based access request, node 101b stores the business affair data B in an LNS storage area 106b in its own logical volume 104b. Likewise, if, as an access request to store business affair data C, node 101c receives an LNS-based access request, node 101c stores the business affair data C in an LNS storage area 106c in its own logical volume 104c.

However, if, as an access request to store business affair data A, node 101a receives a GNS-based access request from a client, node 101a checks the unused capacities of the GNS storage areas 105a, 105b, and 105c of its own logical volume 104a and logical volumes 104b and 104c of other nodes 103b and 103c. In this check, if it is determined that the logical volume with the largest unused capacity is the logical volume 104b, for example, node 101a transfers the business affair data A to node 101b via a network switch 102. Node 101b stores transferred business affair data A in the GNS storage area 105b of the logical volume 104b.

As mentioned earlier, if the access request from the client is an LNS, the nodes 101a to 101c are each able to store data in the LNS storage areas 106a, 106b, and 106c of its own logical volumes 104a to 104c without checking the unused capacities of the logical volumes 104a to 104c, and if the access request from the client is GNS-related, the nodes 101a to 101c are able to determine the storage destination of the data according to the unused capacity of each node. Hence, high-access performance areas (LNS storage areas) can be incorporated into the system while retaining the capacity distribution function.

Furthermore, if there is a focus on a specified node, for example an emphasis on performance and on a node which prioritizes LNS usage, by configuring the value of a for the specified node as a small value, the GNS storage area of the specified node is smaller than the GNS storage area of the other nodes and data transfer from the other nodes to the specified node is minimal. Therefore, by adjusting a according to the operating status, for example, where a indicates the ratio between the GNS storage areas and the LNS storage areas or the proportion, of the overall capacity of the logical volumes, which the capacity of the GNS storage areas occupies, the logical volumes of each node can be managed while the GNS and LNS co-exist. Furthermore, because a can be adjusted according to the operating status, a can be provided for the customer or system administrator as a storage-system performance tuning parameter.

Embodiment

The present embodiment manages these logical volumes, which are the access targets of each client, in association with a GNS and LNS, manages storage areas of each of the logical volumes by dividing these storage areas into GNS storage areas and LNS storage areas, and takes, as an adjustment target, the proportion, of the overall capacity of each of the logical volumes, which the capacity of the GNS storage areas occupies.

Figure 2:
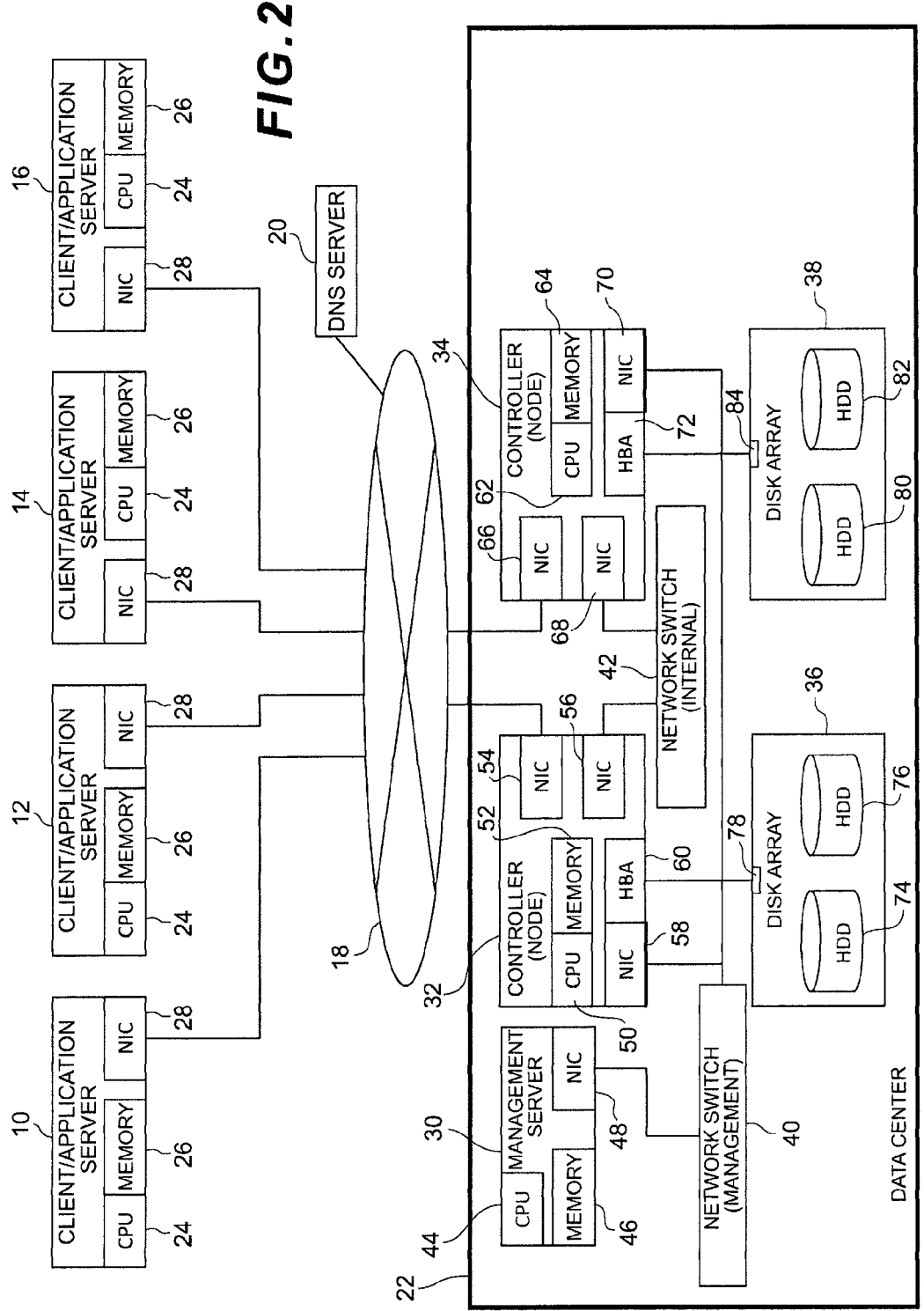
FIG. 2 is a block configuration diagram of a computer system to which the present invention is applied.

An embodiment according to the present invention will be explained hereinbelow with reference to the drawings. FIG. 2 is a block configuration diagram of the overall configuration of a computer system to which the present invention is applied.

In FIG. 2, the computer system is configured from a plurality of clients 10, 12, 14, and 16, a network 18, a DNS (Domain Name System) server 20, and a storage system 22, and the storage system 22 is disposed in a data center, for example.

The clients 10 to 16 are each configured as application servers which comprise a CPU (Central Processing Unit) 24, a memory 26, and an input/output interface (NIC: Network Interface Card) 28, and the input/output interfaces 28 are connected to the network 18.

The CPU 24 functions as a processor which performs integrated control of the whole client and executes various processing according to the application program or control program or the like stored in the memory 26, issuing, for example, an access request (input/output request) corresponding to the application program to the network 18 via the input/output interface 28, and exchanging information with the storage system 22 via the network 18.

If the access requests which are issued from each of the clients 10 to 16 contain a GNS, the DNS server 20 selects an IP (Internet Protocol) address of any node from which the GNS is configured, and transfers the selected IP address to each client.

The storage system 22 is configured from a management server 30, controllers (nodes) 32, 34, disk array apparatuses 36, 38, a management network switch 40, and an internal network switch (internal network) 42.

The management server 30 is a server with which the system administrator manages the whole storage system 22 and which comprises a CPU 44, a memory 46, and an input/output interface (NIC) 48, the input/output interface 48 being connected to the controllers (nodes) 32, 34 via the management network switch 40.

The CPU 44 performs integrated control of the whole management server 30, executes processing in accordance with a control program which is stored in the memory 46, outputs various configuration information and the like for each of the controllers (nodes) 32, 34 via the input/output interface 48 and the management network switch 40, and exchanges information with each of the controllers (nodes) 32, 34 via the input/output interface 48 and the management network switch 40.

The controller 32 is configured from a CPU 50, a memory 52, input/output interfaces (NIC) 54, 56, and 58, and a host bus adapter (HBA) 60, the input/output interface 54 being connected to the network 18, the input/output interface 56 being connected to the internal network switch 42, the input/output interface 58 being connected to the management network switch 40, and the host bus adapter 60 being connected to the disk array apparatus 36.

The controller 34 is configured from a CPU 62, a memory 64, input/output interfaces (NIC) 66, 68, and 70, and a host bus adapter (HBA) 72, the input/output interface 66 being connected to the network 18, the input/output interface 68 being connected to the internal network switch 42, and the host bus adapter 72 being connected to the disk array apparatus 38.

The disk array apparatus 36 comprises, as storage devices, a plurality of HDD (Hard Disk Drives) 74, 76, for example, and comprises a channel adapter (CHA) 78, and the channel adapter 78 is connected to the host bus adapter 60 of the controller 32.

The disk array apparatus 38 is configured from a plurality of HDD 80, 82 and a channel adapter (CHA) 84, for example, as storage devices, and the channel adapter (CHA) 84 is connected to the host bus adapter 72 of the controller 34.

Note that as storage devices, SSDs (Solid State Drives), SAS (Serial Attached SCSI) disks, SATA (Serial ATA) disks, and FC (Fibre Channel) disks and so forth can also be employed in place of the HDDs. Furthermore, storage devices which are built into the controllers 32, 34 can also be employed.

The CPU 50 of the controller 32 comprises a node (hereinafter the controller 32 will sometimes also be referred to as node 32) which functions as a controller or file server for executing data input/output processing with respect to the disk array apparatus 36 in accordance with the operating system (OS) stored in the memory 52.

Here, the CPU 50 manages the logical volumes constructed in the storage areas of the HDDs 74 and 76 of the disk array apparatus 36 as access targets of each of the clients 10 to 16, manages the logical volumes in association with a GNS and LNS, and manages the storage areas of the logical volumes by dividing these storage areas into GNS storage areas representing the access destination in cases where a GNS is added to the access request and LNS storage areas representing the access destination in cases where an LNS is added to the access request, and manages, as an adjustment target, the proportion (a), of the overall capacity of the logical volume, which the capacity of the GNS storage areas occupies.

The CPU 62 of the controller 34 comprises a node (hereinafter the controller 34 will sometimes also be referred to as node 34) which functions as a controller or file server for executing data input/output processing with respect to the disk array apparatus 38 in accordance with the operating system (OS) stored in the memory 64.

Here, the CPU 62 manages logical volumes constructed in the storage areas of the HDDs 80, 82 of the disk array apparatus 38 as access targets of the clients 10 to 16, manages the logical volumes in association with a GNS and LNS, manages the storage areas of the logical volumes by dividing these storage areas into GNS storage areas representing the access destination in cases where a GNS is added to an access request, and LNS storage areas representing the access destination in cases where an LNS is added to the access request, and manages, as an adjustment target, the proportion (a), of the overall capacity of the logical volume, which the capacity of the GNS storage areas occupies.

Here, in cases where a GNS-compatible file system is constructed, for example, the nodes 32 and 34 each provide the GNS-compatible file system to each of the clients 10 to 16 as one file system common to each of the nodes 32, 34. In this case, one of the file systems is configured as a virtualization file system, which is a published file system, in the logical volumes of each of the nodes 32, 34. The directories and files of each of the nodes 32, 34 are connected to the root directory of the virtualization file system.

However, for an LNS-compatible file system, the nodes 32, 34 are each constructed in every node and each file system constructed is provided to each of the clients 10 to 16 in association with an LNS. In this case, file systems specific to each node are configured in the logical volumes of each of the nodes 32, 34. The directories and files of each of the nodes 32, 34 are connected to the root directory of the file system specific to each node.

Furthermore, the logical volumes of each of the nodes 32, 34 can also be employed as Thin Provisioning volumes.

For example, the logical volumes of each of the nodes 32, 34 are not provided to each of the hosts as storage areas of a fixed capacity but instead provided to each host as a virtual logical volume (virtual volume). In this case, a technique has been adopted for allocating, in response to processing to write data to each of the nodes 32, 34, from each host, storage area to a virtual volume in storage area allocation units called pages from a storage area (pool) created from a plurality of logical volumes.

Here, a page is a storage area created by partitioning the logical volumes which the pool comprises (pool volumes) into suitable capacities by means of Logical Block Addresses (LBA). Pages will sometimes also be called segments. Furthermore, an LBA is an address which is used to designate data read/write positions in logical volumes that are provided to each of the hosts 10 to 16 in cases where each of the hosts 10 to 16 read/write data to/from each of the nodes 32, 34.

Here, at first when not accessed by the hosts 10 to 16, the virtual volume of each of the nodes 32, 34 is in a state where logical volumes and pages have not been allocated to the virtual storage area. However, when write access, for example, is input as an access request to the virtual volume from the hosts 10 to 16, the virtual storage area of each virtual volume is divided into a plurality of blocks by a capacity virtualization control function (processing function resulting from startup of the capacity virtualization control program) with write access timing, and a logical volume registered in the pool is allocated to each block. That is, in response to write access to each virtual volume by the hosts 10 to 16, the storage capacity which is provided to the hosts 10 to 16 can be dynamically extended by allocating storage area from the pool to the virtual volume.

Figure 3:
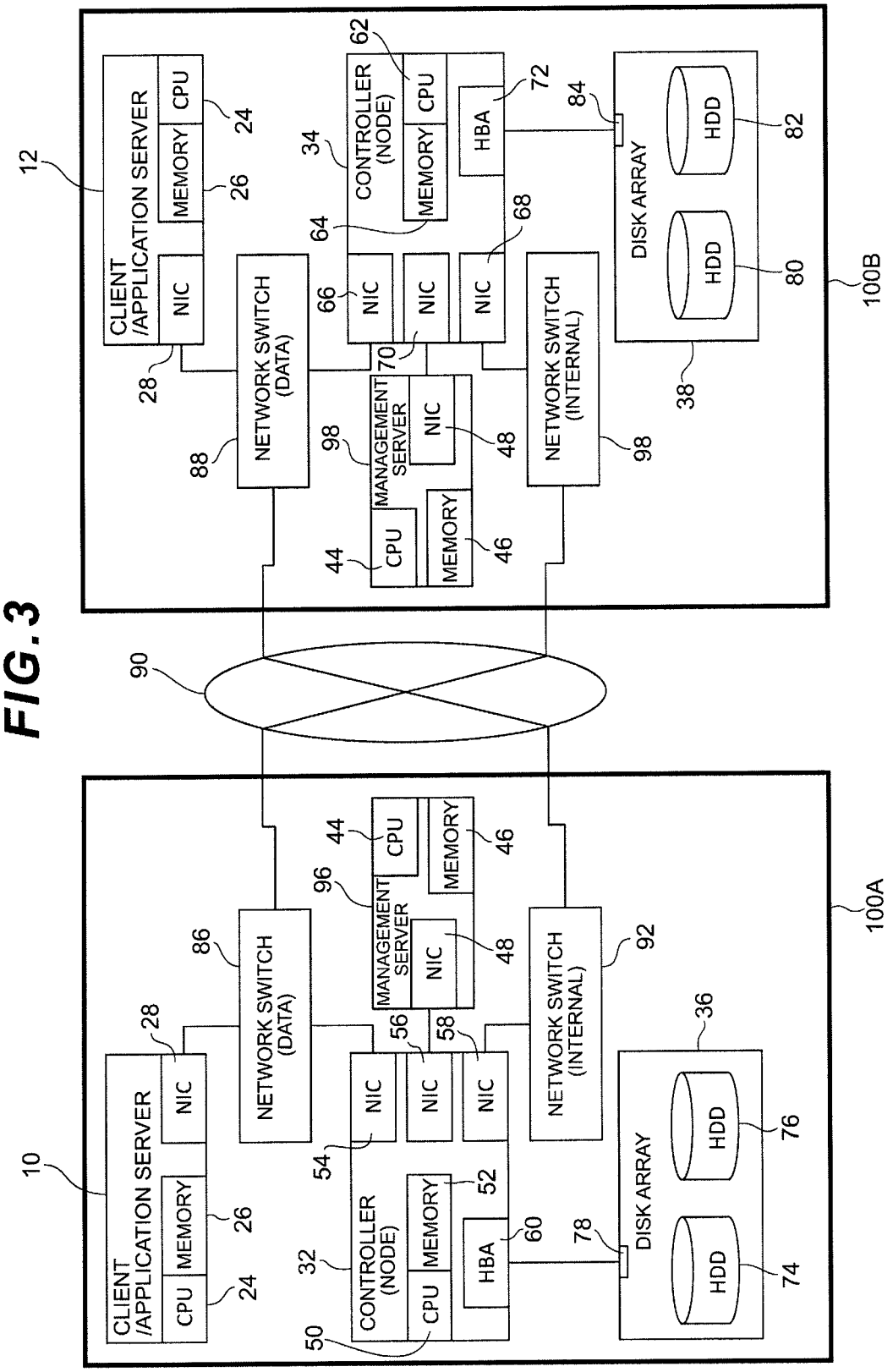
FIG. 3 is a block configuration diagram of another computer system to which the present invention is applied.

FIG. 3 subsequently shows the configuration of the computer system in a case where each node is disposed on a remote site.

In the computer system in FIG. 3, a system disposed on a first site 100A is connected via a network 90 to a system disposed on a second site 100B.

More specifically, the computer system is configured such that one of the clients 10 disposed on the first site 100A is connected to the node 32 via a data network switch 86, another client 12 disposed on the second site 100B is connected to the node 34 via the data network switch 88, the network switch 86 and network switch 88 are connected to the network 90, an internal network switch 92 connected to the node 32 is connected to the network 90, an internal network switch 98 connected to the node 34 is connected to the network 90, and management servers 96 and 98 with the same configuration as the management server 30 are disposed on the first site 100A or second site 100B.

Here, the clients 10, 12, nodes 32 and 34, and disk array apparatuses 36 and 38 and so on also employ the same configurations in the computer system in FIG. 3 and will therefore not be explained here.

When the logical volumes are subsequently managed by each of the nodes 32 and 34 used in the computer system, the following may be considered.

For example, the nodes 32, 34 are each managed such that the capacity of the whole storage area of the logical volumes held by each of the nodes 32, 34 is taken to be X, the proportion of the storage area, used as the GNS storage area, of the storage area in each logical volume is taken to be a, the data-stored capacity of the capacity of the GNS storage area (the capacity of the GNS storage area where data is actually stored) is taken to be Y, and the data-stored capacity of the LNS storage area capacity (the capacity of the LNS storage area where data is actually stored) is taken to be Z.

Figure 4:
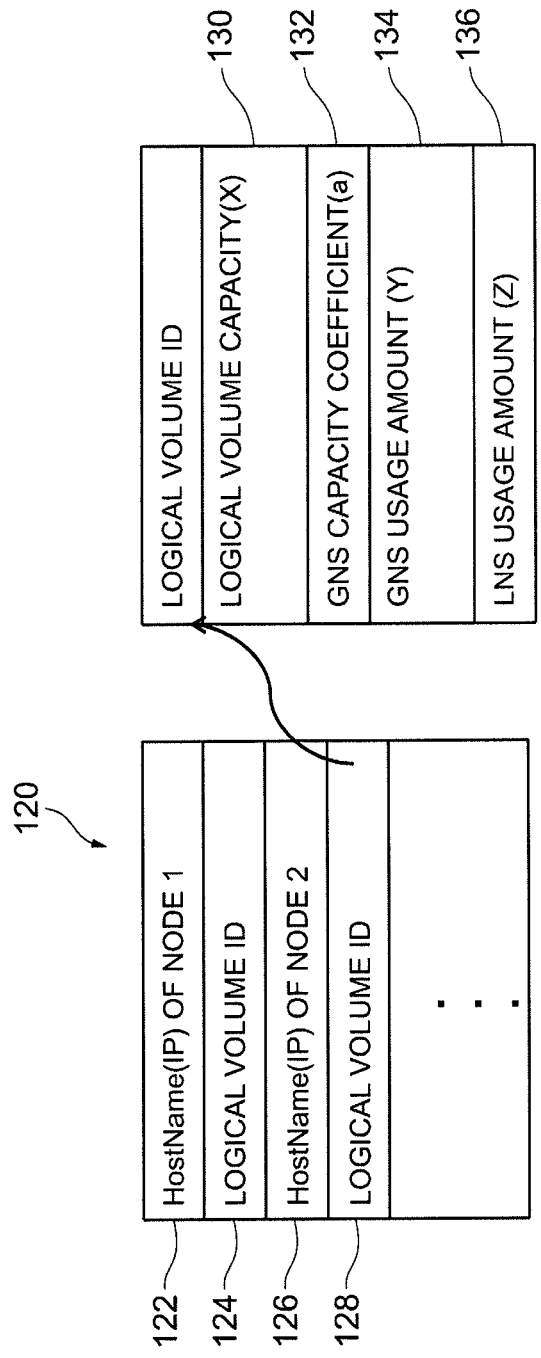
FIG. 4 is a configuration diagram of a management table.

Here, as shown in FIG. 4, information relating to X, Y, and Z is managed in a management table 120 which is stored in the memory 52, 64.

In FIG. 4, the management table 120 is held by both of the nodes 32, 34 and stores, for example, as host names relating to a first node, a host name (IP) 122 of the node 32, and a logical volume ID 124 which is an identifier of the logical volume held by the node 32. Furthermore, the management table 120 stores, as a host name relating to the second node, a host name (IP) 126 of the node 34, and a logical volume ID 128 which is an identifier of the logical volume held by the node 34. In addition, the logical volume IDs 124, 128 each store a logical volume capacity (X) 130, a GNS capacity coefficient (a) 132, a GNS usage amount (Y) 134, and an LNS usage amount (Z) 136. In addition, node 32 holds a table, for logical volume ID 124 which is a logical volume which node 32 itself holds, which stores the logical volume capacity (X) 130, the GNS capacity coefficient (a) 132, the GNS usage amount (Y) 134, and the LNS usage amount (Z) 136. Node 34 holds a table, for logical volume ID 128 which is a logical volume which node 34 itself holds, which stores the logical volume capacity (X) 130, the GNS capacity coefficient (a) 132, the GNS usage amount (Y) 134, and the LNS usage amount (Z) 136.

Figure 5:
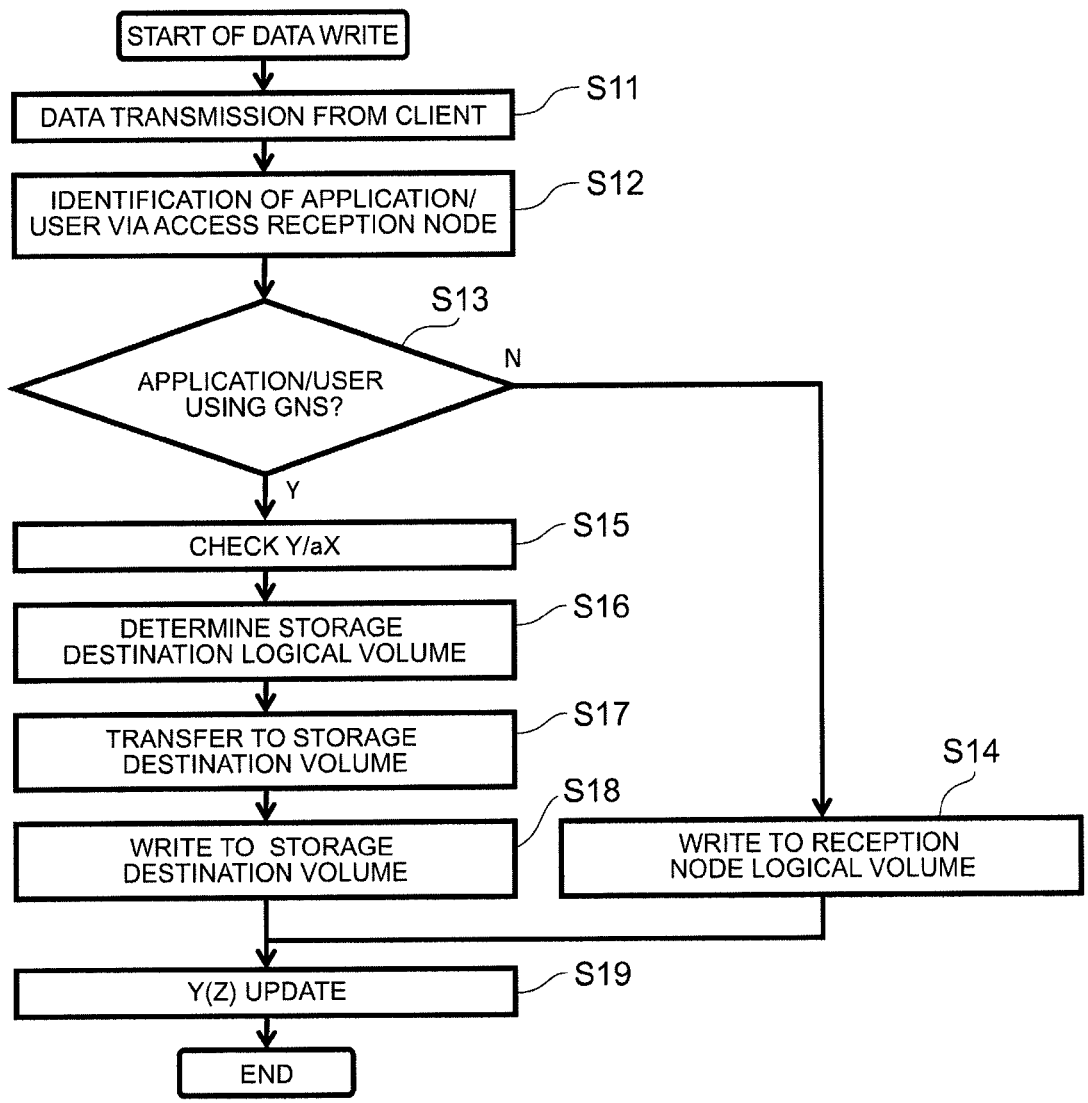
FIG. 5 is a flowchart illustrating data write processing.

Write processing according to the present embodiment will be explained next with reference to the flowchart in FIG. 5.

This processing is started as a result of any of the clients among clients 10 to 16 issuing a write-access access request according to an application program. Here, the clients 10 to 16 are also able to access the storage system 22 by designating the path of the namespace, for example, and are able to determine which namespace is used to access each application.

First, the data (write data) is transmitted from a client, for example client 10, together with the write-access access request to node 32 of the storage system 22 via the network 18 (S11), and if the access request is received by node 32, node 32 identifies the user from the application added to the access request (S12), and determines whether or not the application added to the access request is an application using a GNS (S13).

Here, if node 32 determines, based on the path name, for example, that this is not an application using a GNS, that is, access is made using an LNS, the node 32 writes write data to the logical volume of the node 32 which is the reception node (S14) and advances to the processing of step S19, and if it is determined in step S13 that the application uses a GNS, that is, that access is made using a GNS, node 32 checks Y/aX for the logical volumes of each of the nodes 32, 34 in order to check the unused capacity of the logical volumes held by each of the nodes 32, 34 (the GNS storage area unused capacity) (S15).

Thereafter, if the GNS storage area unused capacity of node 34 is larger than the GNS storage area unused capacity of node 32, node 32 determines the logical volume of node 34 as the storage destination logical volume, and conversely if the capacity of the GNS storage area of node 32 is larger than the capacity of the GNS storage area of node 34, node 32 determines the logical volumes held by node 32 as the storage destination logical volume (S16).

Node 32 then transfers write data to the storage destination volume (S17) and writes write data to the storage destination volume (S17).

Here, when the storage destination volume is the logical volume of node 32, node 32 writes write data to its own logical volume, and when the storage destination volume is the logical volume of node 34, transfers write data to node 34 via the network switch 42. Node 34 writes write data which has been transferred from node 32 to the logical volume of node 34.

If the value of Y subsequently changes as a result of node 32 or node 34 writing write data to the logical volume, that is, if there is an increase in the data-stored capacity in the GNS storage area capacity, node 32 or 34 updates the value of Y (S19), and ends the processing of this routine.

Figure 6:
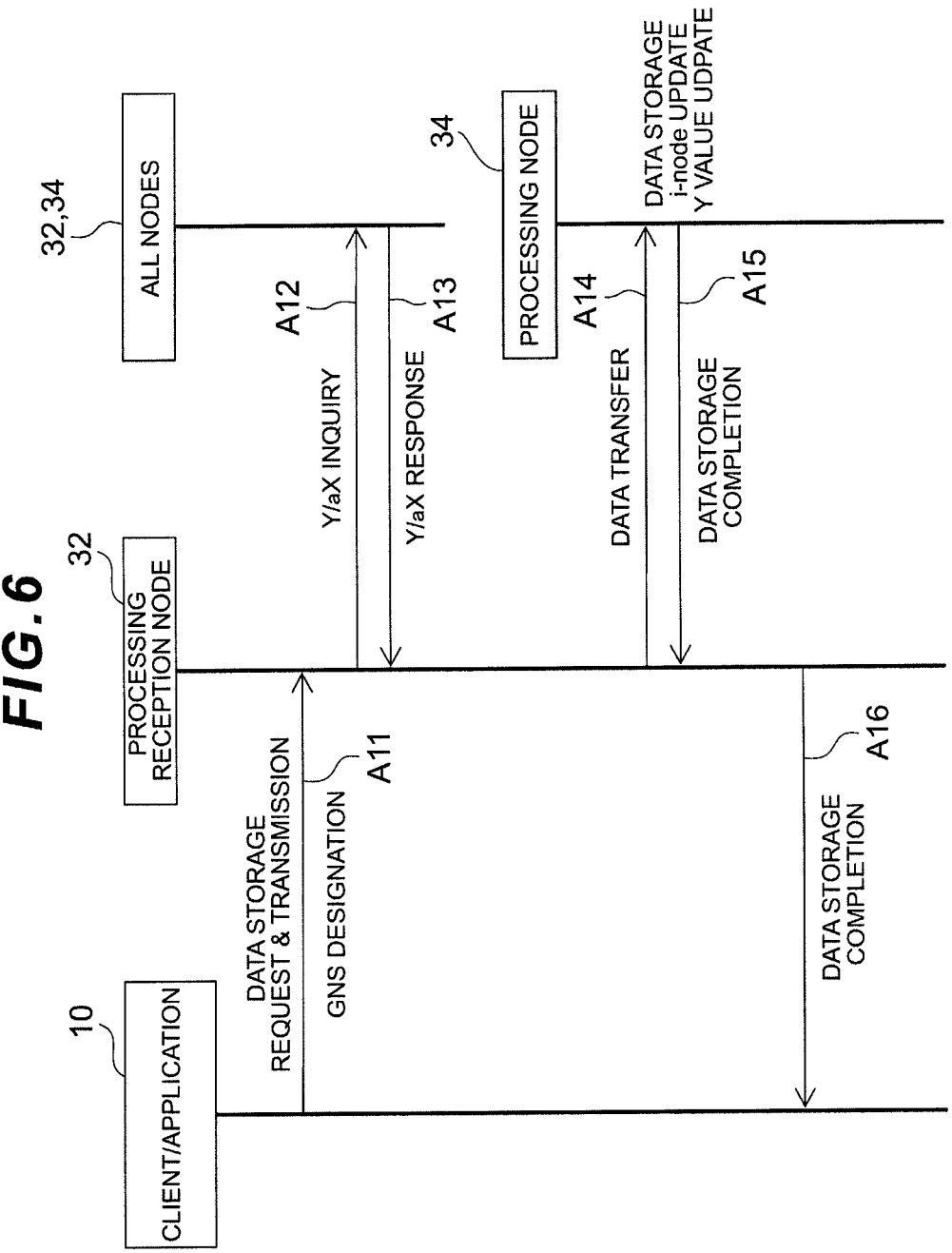
FIG. 6 is a sequence diagram illustrating write processing by way of GNS designation.

The write processing when the client performs write access using the GNS will be explained next according to the sequence in FIG. 6.

First, the client 10 transmits a GNS designation-based data storage request to any of the nodes (A11), and if node 32 of nodes 32 and 34 receives the data storage request, node 32 issues, as the processing reception node, a Y/aX inquiry to all the nodes, that is, to nodes 32 and 34 in order to check the unused capacity of the logical volumes (A12). Subsequently, each of the nodes 32 and 34 sends back a Y/aX response to the processing reception node 32 (A13).

The processing reception node 32 takes the logical volume with the largest unused capacity as the storage destination, determines the node holding this logical volume as the processing node, and transfers data to the processing node. For example, upon determining the processing node to be node 34, the processing reception node 32 transfers write data to the processing node 34 (A14).

Thereafter, the processing node 34 stores write data in the logical volume, updates the i-node, updates the Y value, and informs the processing reception node 32 that data storage is complete (A15), and the processing reception node 32 reports this notification regarding data storage completion to the client 10 (A16).

Note that when the processing reception node 32 itself determines that it is the processing node, the processing reception node 32 stores the write data in its own logical volume without performing a data transfer, updates the i-node, updates the value of Y, and reports this notification regarding data storage completion to the client 10.

Figure 7:
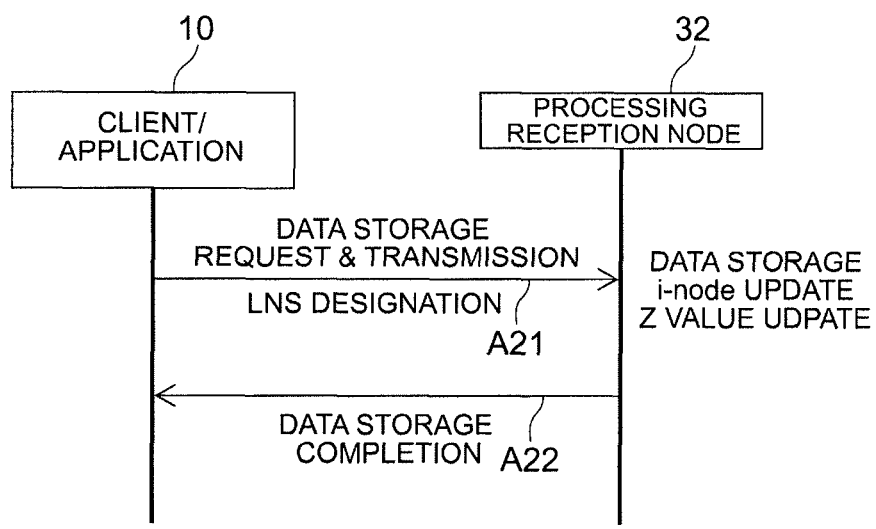
FIG. 7 is a sequence diagram illustrating write processing by way of LNS designation.

The write processing when the client performs write access using the LNS will be explained next according to the sequence in FIG. 7.

When the client 10 transmits the data storage request designating LNS to a node, for example node 32 (A21), node 32 functions as the processing reception node, stores the write data in the LNS storage area in its own logical volume, updates the i-node, updates the value of Z, and reports this notification regarding data storage completion to the client 10 (A22).

When the client 10 transmits the data storage request designating LNS to a node, for example node 34 (A21), node 34 functions as the processing reception node, stores the write data in the LNS storage area in its own logical volume, updates the i-node, updates the value of Z, and reports the notification regarding data storage completion to the client 10 (A22).

As a result, the client 10 is capable of storing data in the logical volume of node 32 or node 34 by issuing a data storage request designating LNS to node 32 or node 34.

Figure 8:
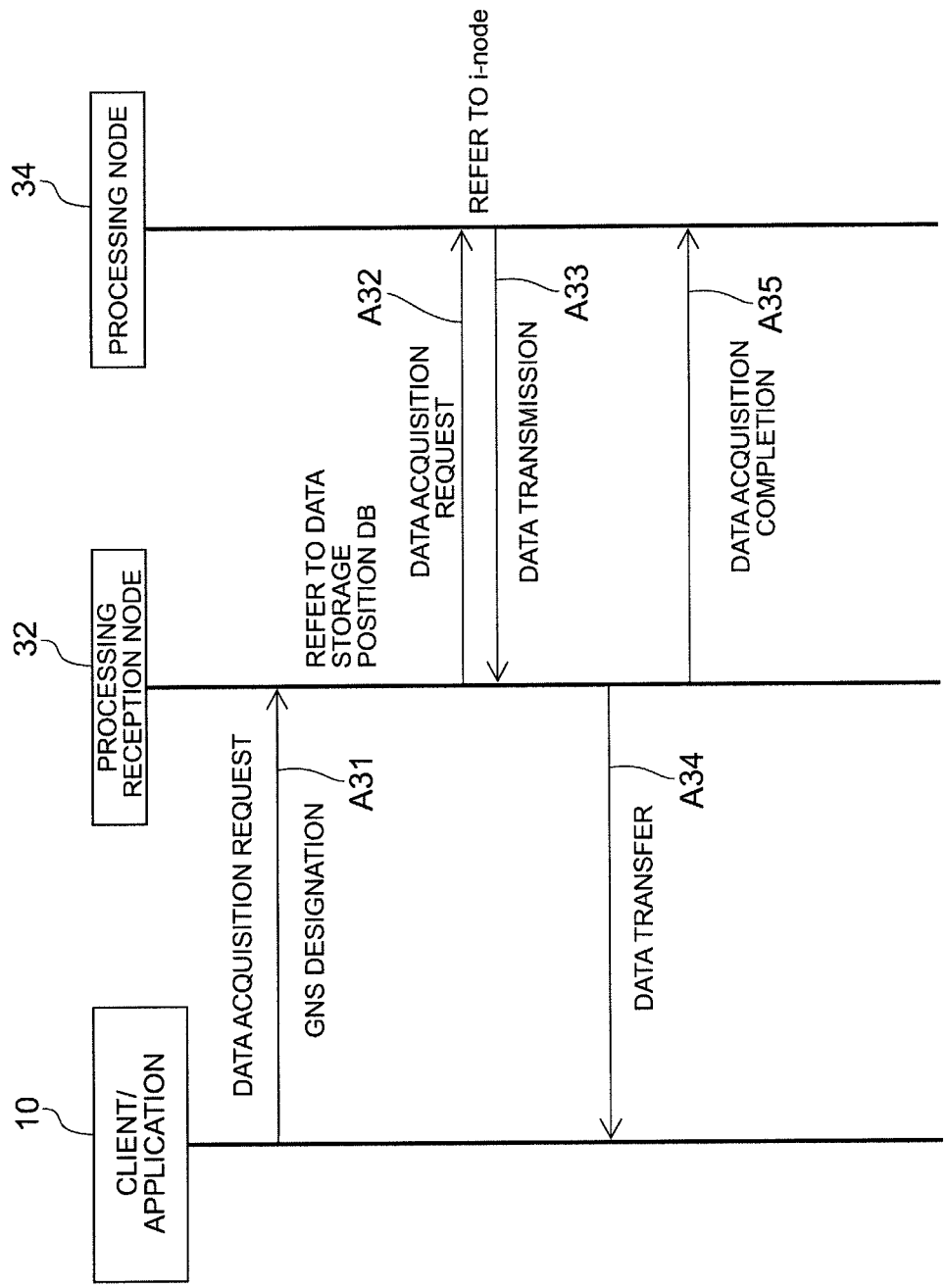
FIG. 8 is a flowchart illustrating read processing by way of GNS designation.

The read processing when the client performs read access using the GNS will be explained next according to the sequence in FIG. 8.

For example, client 10 issues a GNS designation-based data acquisition request (A31), and if node 32 of nodes 32 and 34 receives the data acquisition request, node 32 functions as the processing reception node 32, refers to the database, searches for the data storage position, and if the data storage position is node 34, takes the node 34 as the processing node 34, and outputs the data acquisition request to the node 34 (A32).

If the data acquisition request is received, node 34 refers to the i-node, reads data designated by the data acquisition request from the disk array apparatus 38, transmits the read data to node 33 as read data (A33).

Thereafter, node 32 transfers the received data to client 10 as the read data (A34), and issues notification to the effect that data acquisition is complete to the node 34 (A35).

As a result, if the data acquisition request is received, node 32 is capable of acquiring read data designated by the data acquisition request from the processing node 34 and transferring the read data to the client 10.

Figure 9:
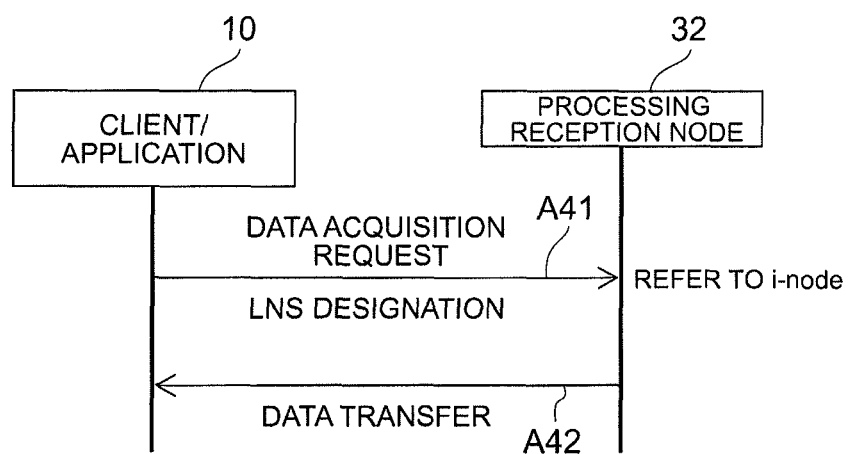
FIG. 9 is a flowchart illustrating read processing by way of LNS designation.

The read processing when the client performs read access using the LNS will be explained next according to the sequence in FIG. 9.

For example, the client 10 issues an LNS designation-based data acquisition request to node 32 which is an LNS-designated node among the nodes 32, 34 (A41), and when node 32 receives the data acquisition request, node 32 functions as a processing reception node. Here, based on the data acquisition request, node 32 refers to the i-node, reads data designated by the data acquisition request from the disk array apparatus 36, and transfers the read data to client 10 as read data (A42).

As a result, the client 10 is capable of acquiring read data from the LNS-designated node 32 by issuing a data acquisition request designating LNS.

An example of a case where definitions of various parameters managed by the management table 120 are changed according to the system usage status will be described next.

Cases where definitions of various parameters are changed include, for example, a case where a large amount of the capacity of the logical volume is being consumed by a specific business affair and the usage amount of the LNS storage areas is close to (1-a) X and a case where the GNS usage amount increases for the whole system and the unused capacity of the GNS storage areas is minimal.

In either case, the option to either Add a new logical volume or Change the a value by increasing the a value must be provided and the definitions of each parameter must be changed.

Here, if the logical volume used in the GNS storage area is added as a logical volume, then Y is constant, but X and a increase, Y/aX decreases, and migration occurs from another logical volume to the added logical volume.

Furthermore, if the logical volume used in the LNS storage area is added as a logical volume, Y is constant, but X increases, a decreases and Y/aX is fixed. That is, Y/aX is fixed because the changes in a and X offset one another.

However, if the a value is changed, for example if the a value is increased and the GNS storage area is increased, Y/aX decreases and data migration may occur from another logical volume to the logical volume for which the a value is increased.

Furthermore, if the a value is reduced and the GNS storage area is reduced, X and Y are constant, Y/aX increases and data migration may occur to another logical volume from a logical volume for which the a value is reduced.

Figure 10:
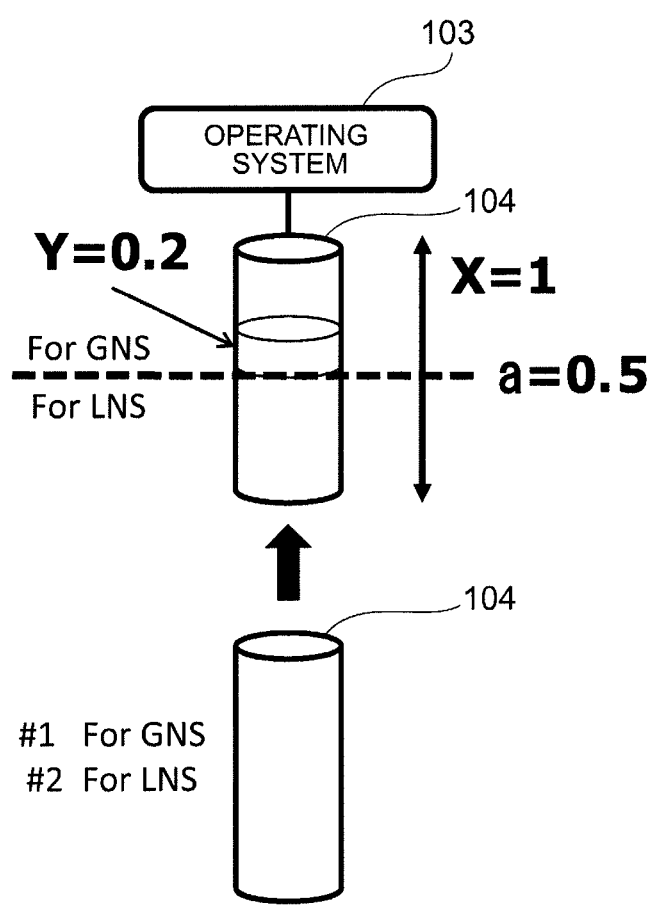
FIG. 10 is a schematic diagram illustrating volume addition processing.

More specifically, in a case where a logical volume is added, for instance in a case (case #1) where, as shown in FIG. 10, a logical volume 104 of the same size as the existing logical volume 104 is added and the added logical volume 104 is used as a GNS storage area, if the capacity of the whole pre-change logical volume is X1, the usage amount is Y1, and the GNS proportion is a1, and X1=1, y1=0.2, and a1=0.5, then X2=2, Y2=0.2, and a2=0.75 after the logical volume 104 is added. As a result, Y/aX decreases, and data migration may occur to the added logical volume from another logical volume due to the reduction in the GNS storage area.

However, in a case where a logical volume 104 of the same size as the existing logical volume 104 is added and the added logical volume 104 is used as an LNS storage area (case #2), before the change X1=1, Y1=0.2, and a1=0.5, but after the change X2=2, Y2=0.2, and a2=0.25. In this case, although the capacity of the LNS storage area increases, Y/aX=0.4 is constant and the capacity of the GNS storage area is also constant and therefore data migration from another logical volume does not occur due to the addition of the logical volume 104.

Figure 11:
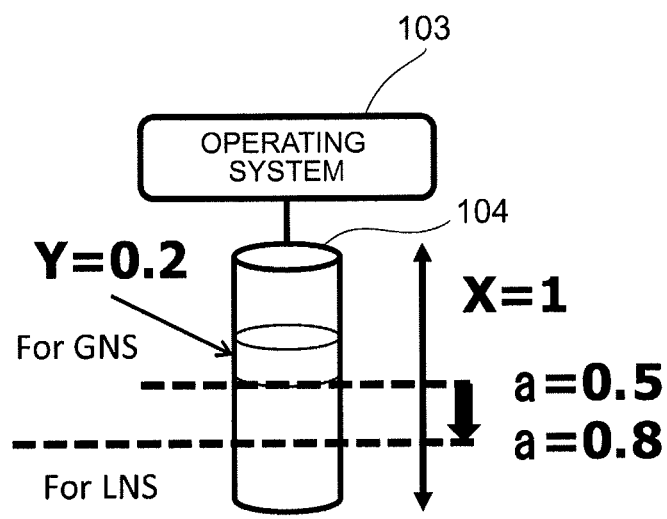
FIG. 11 is a schematic diagram illustrating processing when adding an a value.

Subsequently, as shown in FIG. 11, in cases where value a is increased (case #3), when the parameters for the logical volume 104 before the change are X1=1, Y1=0.2, and a1=0.5, if the value of a is changed from 0.5 to 0.8, then X2=1, Y2=0.2, and a2=0.8 after the change. That is, when value a is increased, Y/aX decreases, and data migration may occur from another logical volume to the logical volume with an increased value a due to the increase in the GNS storage area.

Figure 12:
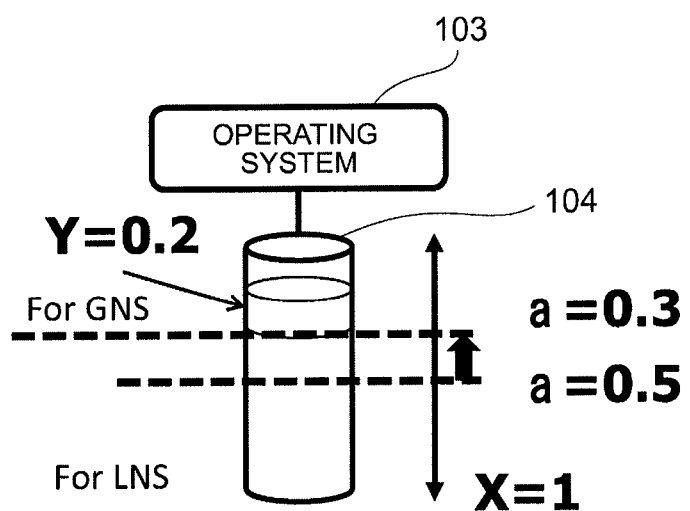
FIG. 12 is a schematic diagram illustrating processing when reducing the a value.

Furthermore, as shown in FIG. 12, in cases where value a is reduced (case #4), if before value a is changed X1=1, Y1=0.2, and a1=0.5 and value a is reduced from 0.5 to 0.3, then X2=1, Y2=0.2, and a2=0.3, and due to the increase in Y/aX, the GNS storage area is reduced and data migration may occur from the logical volume with a reduced value a to another logical volume.

Since there is a disparity in Y/aX between the logical volumes as a result of changes in cases other than case #2 (cases #1, #3, and #4), the system executes data migration processing to restore a balance. This is because rather than there being an intention to originally store the data or files stored in the GNS storage areas in a specified logical volume, the data or files are transferred.

Note that, in the computer system of FIG. 3, if the system administrators of each of the sites differ, changes in the value a are managed for each of the sites and therefore changes in the value a can also be configured as Impossible for the system overall.

Figure 13:
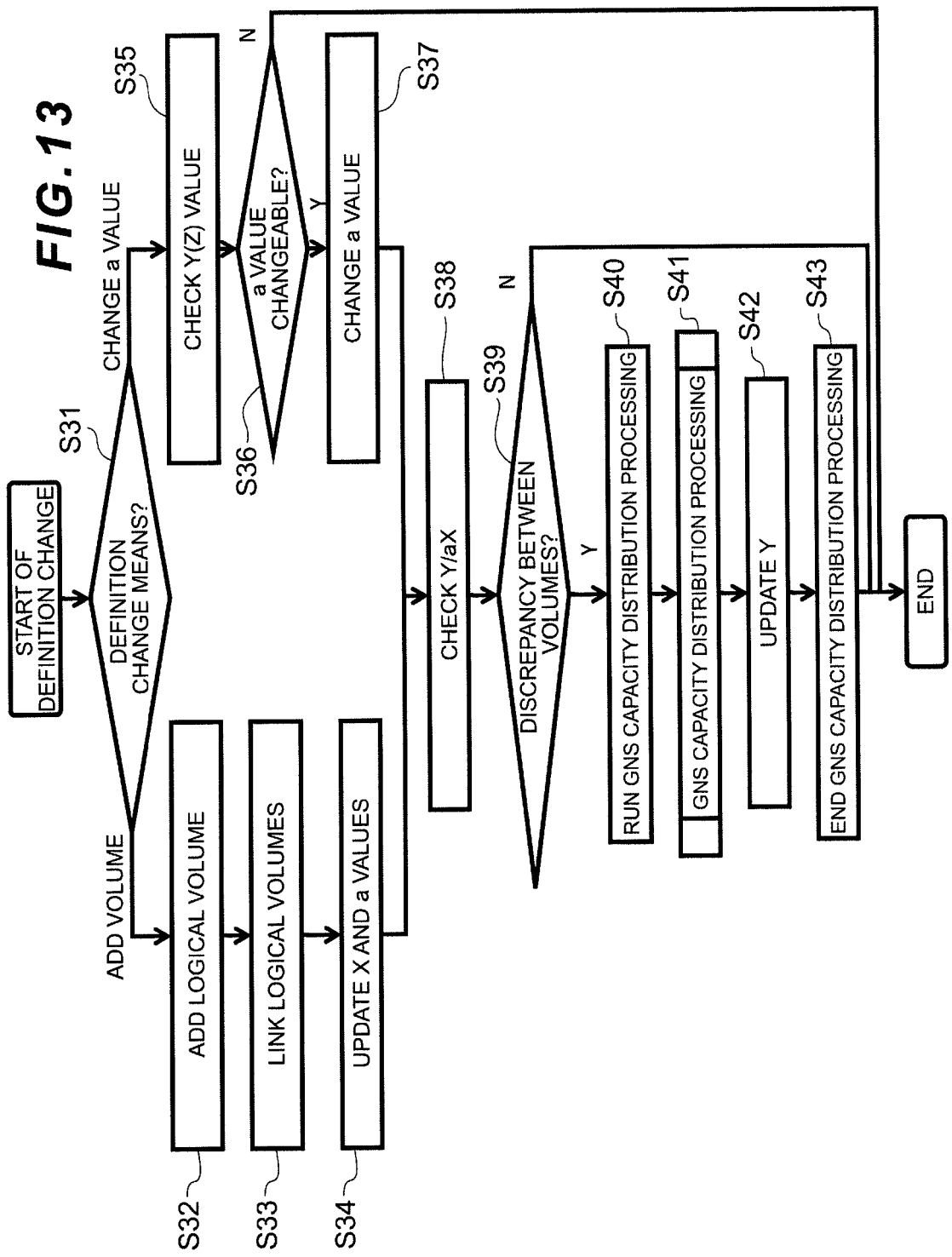
FIG. 13 is a flowchart illustrating definition change processing.

Definition change processing will be explained next with reference to the flowchart in FIG. 13.

This processing is executed by each of the nodes 32, 34 based on information from the management server 30. Hereinafter a case where node 32 executes processing will be described.

First, based on a change request from the management server 30, the node 32 determines whether or not the definition change means is Add volume or Change value a (S31) and if it is determined that a volume is to be added, a logical volume that is used as a GNS storage area or LNS storage area is added to the logical volumes held by the node 32 (S32), and processing to link the added logical volume to the original logical volume is performed (S33). For example, a logical volume which is added to an existing logical volume is linked using an LVM (Logical Volume Manager) and processed as a single logical volume overall.

Node 32 then updates the values of X and value a as a result of the logical volume being added (S34), and advances to the processing of step S38.

However, if the definition change means determines in step S31 that value a is to be changed, node 32 checks the value Y or Z (S35), determines whether value a can be changed (S36), and ends the processing in the routine when it is determined that value a cannot be changed, but when it is determined that value a can be changed, the definition change means performs a change to increase or reduce value a (S37), and advances to the processing of step S38.

In step S38, node 32 checks Y/aX as a result of the logical volumes being added or the change in value a (S38), and determines whether or not there is a disparity between the logical volumes (S39). That is, node 32 determines whether Y/aX has changed and if it is determined that Y/aX has not changed, node 32 ends the processing of this routine, but if it is determined that Y/aX has changed, node 32 starts the GNS capacity distribution processing (S40), executes GNS capacity distribution processing (S41), updates value Y (S42), then ends GNS capacity distribution processing (S43), and ends the processing of this routine.

Note that the processing of steps S40 to S43 can also be processed asynchronously with the other nodes.

Figure 14:
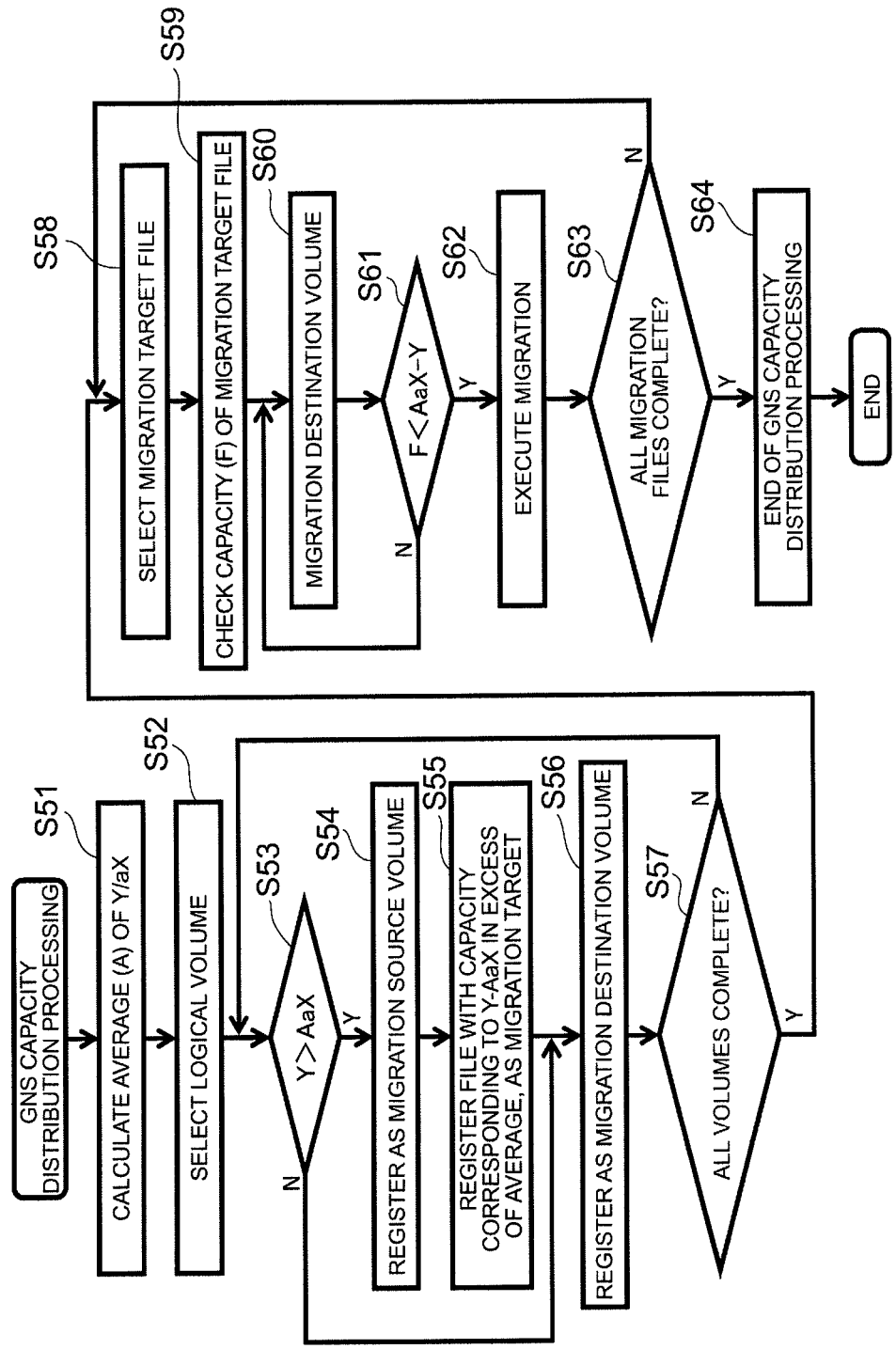
FIG. 14 is a flowchart illustrating GNS capacity distribution processing.

GNS capacity distribution processing will be explained next with reference to the flowchart in FIG. 14. This processing is processing in step S41 of FIG. 13.

This processing will be explained as processing by node 32. First of all, due to a logical volume being added or a change in value a, node 32 calculates the average A of Y/aX for each logical volume (S51), then sequentially selects the logical volume of each node (S52), and determines, for the selected logical volume, whether or not Y is larger than AaX (S53); if it is determined that Y is not larger than AaX, node 32 assumes that this logical volume is a volume with a smaller than average unused capacity and advances to the processing of step S56, and if it is determined that the value of Y is larger than AaX, that is, that the value of Y has changed, node 32 registers the selected logical volume as a migration source volume (S54), selects a file with a capacity equivalent to Y-AaX, which is the amount by which the average is exceeded, from the file system and registers the file as a migration target (S55).

Thereafter, if it is determined in step S53 that Y is not larger than AaX, node 32 registers a logical volume with a smaller than average unused capacity as the migration destination volume (S56), determines whether or not the processing to register all the logical volumes as a migration source volume or migration destination volume is complete (S57); when the registration processing is not complete for all the volumes, node 32 repeats the processing of steps S53 to S57, and when the registration processing is complete for all volumes, node 32 selects the migration target file (S58).

The node 32 then checks the capacity F of the migration target file (S59), selects a migration destination volume (S60), and then determines whether or not the capacity F of the migration target file is smaller than (AaX-Y) (S61); if it is determined that F is larger than (AaX-Y), the node 32 returns to the processing of step S60, and if it is determined that F is smaller than (AaX-Y), the node 32 executes migration to move files (data) of the migration source volume to the migration destination volume (S62) and determines whether or not migration is complete for all the migration target files (S63); if migration is not complete for all the migration target files, node 32 repeats the processing of steps S58 to S63, and if migration is complete for all the migration target files, node 32 ends GNS capacity distribution processing (S64) and ends the processing of this routine.

Figure 15:
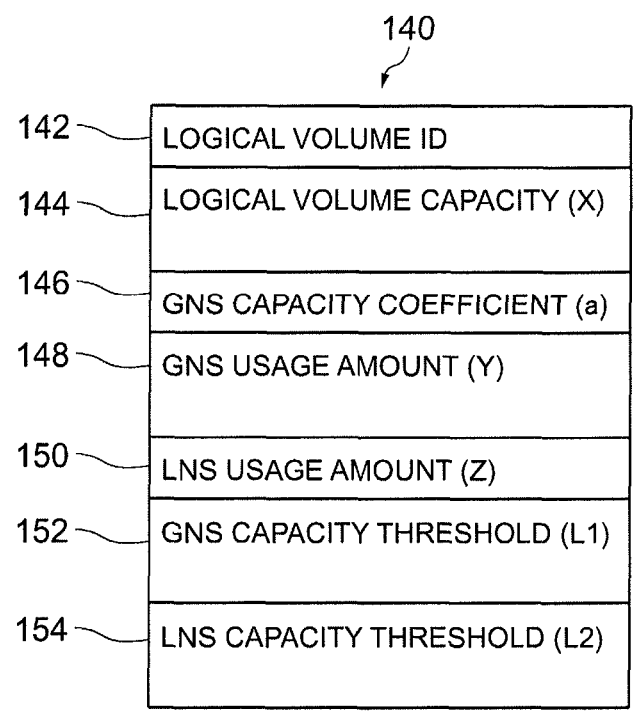
FIG. 15 is a configuration diagram of a management table.

Thereafter, FIG. 15 shows the configuration of a management table 140 which is used when the node automatically monitors capacity and automatically changes definitions.

The management table 140 is a table which is used by the nodes to monitor, at regular intervals, the usage amount of the GNS and LNS storage areas, and manage whether or not each usage amount exceeds the threshold. The management table 140 stores information relating to a logical volume ID 142, a logical volume capacity (X) 144, a GNS capacity coefficient (a) 146, a GNS usage amount (Y) 148, an LNS usage amount (Z) 150, a GNS capacity threshold (L1) 142, and an LNS capacity threshold (L2) 144.

Figure 16:
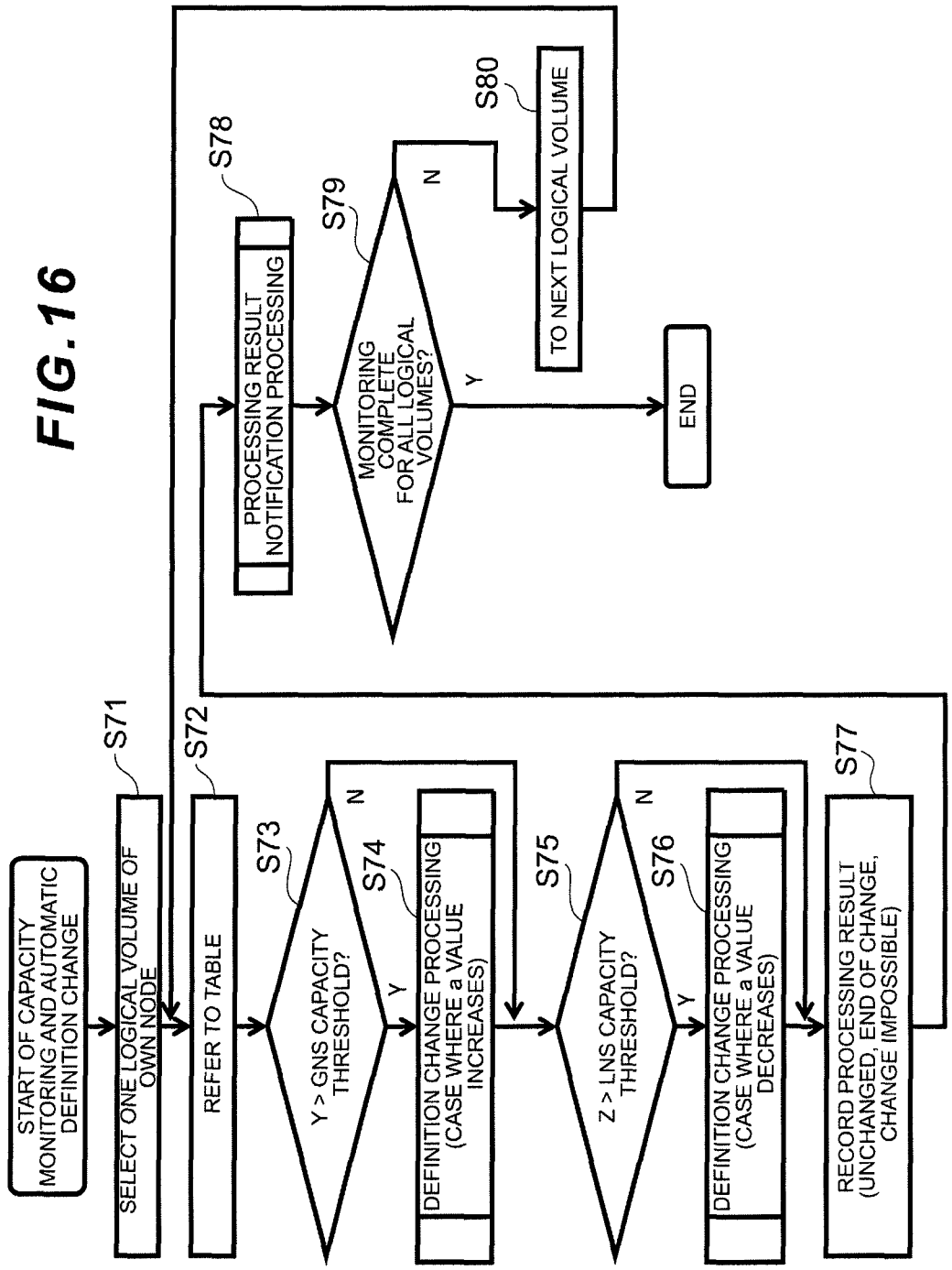
FIG. 16 is a flowchart illustrating capacity monitoring and automatic definition change processing.

Capacity monitoring and automatic definition change processing will be explained next with reference to the flowchart in FIG. 16. This processing is carried out at regular intervals as background processing, for example.

First, node 32 selects one of its own logical volumes (S71), refers to the management table 140 based on the selected logical volume (S72), determines whether Y is larger than the GNS capacity threshold L1 (S73); if it is determined that the value of Y is smaller than the GNS capacity threshold L1, node 32 advances to the processing of step S75, and if it is determined that the value of Y is larger than the GNS capacity threshold L1, node 32 performs, as definition change processing, processing to increase the value a in order to enlarge the GNS storage area capacity (S74), and advances to the processing of step S75.

Thereafter, node 32 determines whether or not the value of Z, which is the usage amount of the LNS storage area, is larger than the LNS capacity threshold L2; if the value of Z is determined to be smaller than the LNS capacity threshold L2, node 32 advances to the processing of step S77, and if the value of Z is determined to be larger than the LNS capacity threshold L2, node 32 executes, as definition change processing, processing to reduce the value a in order to create a small GNS storage area, for example (S76), and advances to the processing of step S77.

In step S77, node 32 records the results of processing, recording, for example, Unchanged when there is no change in the definition, and recording Change Complete when value a increases or decreases, and if a change in value a is not allowed by the system, node 32 performs processing to record Change Impossible and then notify the management server 30, for example, of the processing result (S78).

Thereafter, node 32 determines whether or not monitoring of all the logical volumes is complete (S79); if monitoring of all the logical volumes is incomplete, node 32 performs processing to select the next volume (S80) and repeats the processing of steps S72 to S79, but if monitoring of all the logical volumes is complete, node 32 ends the processing of this routine.

Note that, for a threshold of 90%, the GNS or LNS capacity threshold is set as aX*0.9.

Figures 17, 18:
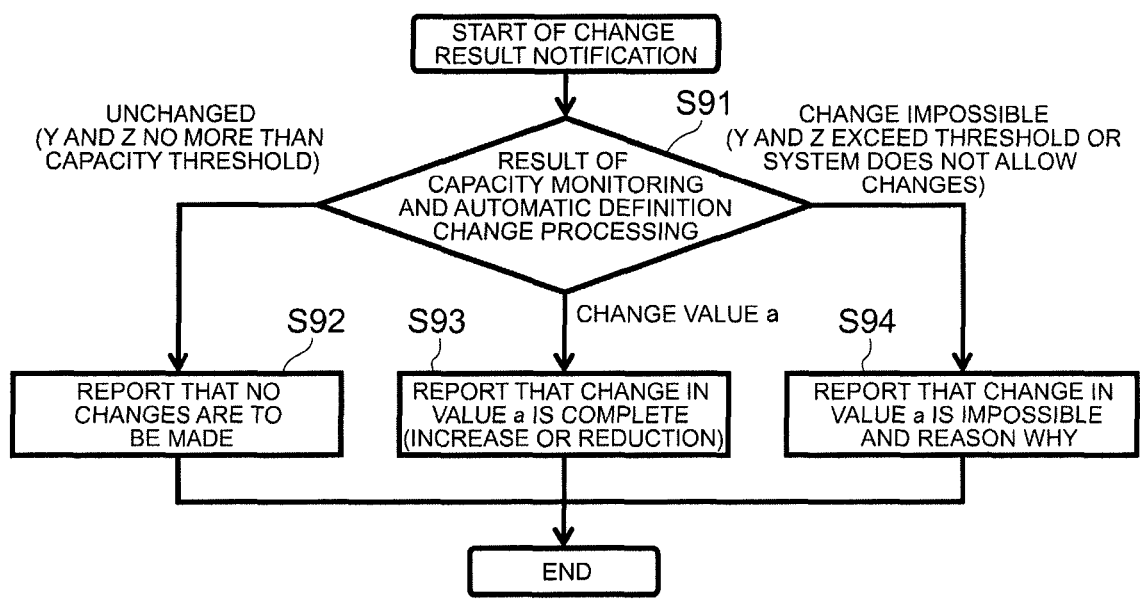
FIG. 17 is a configuration diagram of a processing result record table.
FIG. 18 is a flowchart illustrating processing result notification processing.

FIG. 17 then shows the configuration of a processing result recording table 160.

The processing result recording table 160 comprises Y (GNS usage amount) 162 and Z (LNS usage amount) 164 as management items, where Y (GNS usage amount) 162 is configured from an above-threshold value 166 and a below-threshold value 168, and Z (LNS usage amount) 164 is configured from an above-threshold value 170 and a below-threshold value 172.

Value a Unchangeable is registered in the processing result record table 160 when Y and Z are both above the threshold and Reduce Value a is registered in this table when Y is below threshold and Z is above threshold. Increase Value a is registered when Y is above threshold and Z is below threshold and No Further Processing is registered when Y is below threshold and Z is below threshold.

Processing result notification processing will be explained next with reference to the flowchart in FIG. 18. This processing is processing in step S78 of FIG. 16.

First, node 32 determines the capacity monitoring and automatic definition change processing result (S91); if Y and Z are unchanged and below the capacity threshold, node 32 notifies the management server 30 of the processing result which is No Further Processing (S92); if it is determined that value a has been changed, as notification that the change in value a is complete, notification that Value a Is To B Increased is sent to the management server 30 if value a is to be increased; if it is determined that value a is to be reduced, node 32 notifies the management server 30 that Value a Is To Be Reduced (S93); and if both Y and Z exceed the threshold or changes to value a are not allowed by the system, node 32 notifies the management server 30 that Value a Cannot Be Changed and reports the reason why (S94), and ends the processing of this routine.

Figure 19:
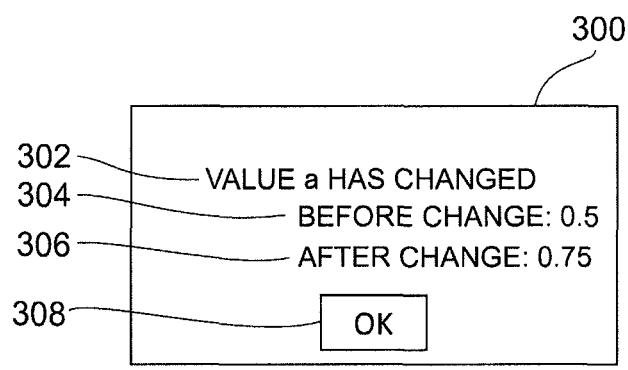
FIG. 19 is a diagram illustrating a display example of a display screen after the a value is modified.

A display example of a display screen for when value a is changed is illustrated next in FIG. 19.

If value a is changed by a manual operation by the system administrator, the display screen 300 of the management server 30 displays a processing result 302 Value a Has Been Changed, displaying a pre-change value a 304 of 0.5, for example, and a changed value a 306 of 0.75, for example. Thereafter, when the system administrator operates the OK button 308, the displayed content is recorded in the management tables 120, 130 and so on of each of the nodes 32, 34.

Figure 20:
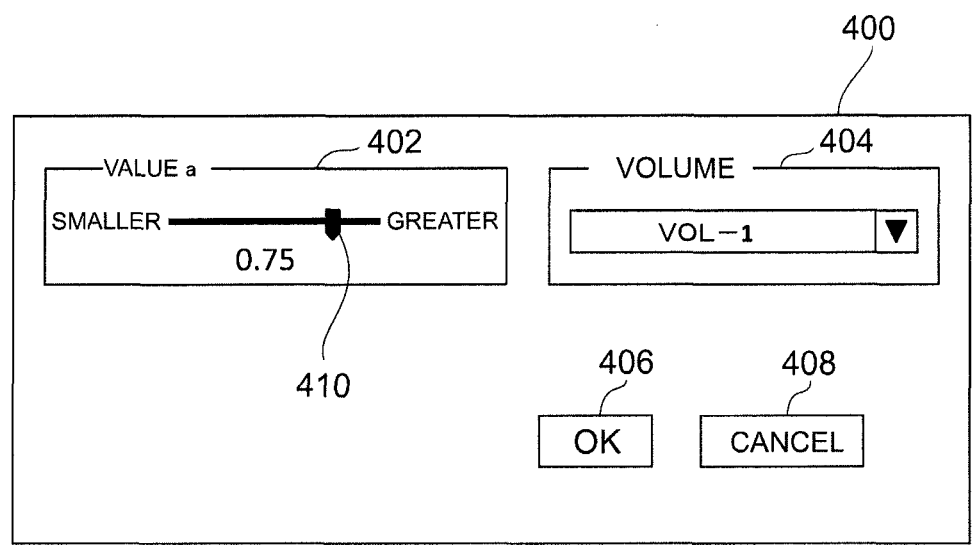
FIG. 20 is a diagram illustrating a display example of a configuration screen when the a value is configured.

A display example of a configuration screen for a case where the user changes a is shown next in FIG. 20.

The configuration screen 400 is configured from a value a manipulation area 402 for configuring value a, a volume selection area 404 for selecting a logical volume, an OK button 406, and a cancel button 408.

The user is able to manipulate a slider 410 of the value a manipulation area 402 in order to set the slider 410 in an optional position, and then, by operating the OK button 406, is able to configure value a at the value of the position where the slider 410 is set. Furthermore, the user is able to operate a pull-down menu button of the volume selection area 404 to select a logical volume and is then able to select the logical volume by operating the OK button 406.

According to the present invention, each of the nodes 32, 34 is able to monitor its own load status, and depending on changes in the load, adjust the proportion, of the overall capacity of the logical volumes, of the capacity occupied by the global namespace storage area (the ratio between the global namespace storage area and the local namespace storage area) of the logical volume of each node can be adjusted.

For example, each of the nodes 32, 34 monitors its own load state, and when the load is high, reduces a which indicates the proportion, of the overall capacity of the logical volumes, of the capacity occupied by the global namespace storage area and is able, by reducing the capacity of the global namespace storage area, to suppress data migration from another node. In this case, when there is a higher load, a drop in the processing performance can be prevented through data migration from another node.

Furthermore, each of the nodes 32, 34 monitors its own load state and when the load is low, increases a, which indicates the proportion, of the overall capacity of the logical volumes, of the capacity occupied by the global namespace storage area and is able, by increasing the capacity of the global namespace storage area, to accept data migration from another node.

Moreover, in the present embodiment, the nodes 32 and 34 are each capable of comparing Y (first data-stored capacity) in the global namespace storage area in each of the logical volumes with the global namespace capacity threshold (GNS capacity threshold) which is configured for the global namespace storage area, of comparing the local namespace capacity threshold (LNS capacity threshold) which is configured for the local namespace storage areas with Z (second data-stored capacity) in the local namespace storage area in each logical volume, and of adjusting a based on the comparison results.

For example, a can be increased on condition that Y (the first data-stored capacity) exceeds the global namespace capacity threshold and Z (the second data-stored capacity) is smaller than the local namespace capacity threshold, and a can be decreased on condition that Y (the first data-stored capacity) is smaller than the global namespace capacity threshold and Z (the second data-stored capacity) exceeds the local namespace capacity threshold.

According to the present embodiment, a, which indicates the ratio (the proportion of the capacity by which the global namespace storage area occupies the overall capacity of the logical volumes) between the global namespace storage area and the local namespace storage area of the logical volumes of each of the nodes 32, 34, can be adjusted according to the operating status of the application program which is used by the client, for example.

[Reference Signs List]

| | |
|---|---|
| 10, 12, 14, 16 | Client (Client computer) |
| 18 | Network |
| 20 | DNS server |
| 22 | Storage system |
| 30 | Management server |
| 32, 34 | Nodes (controllers) |
| 36, 38 | Disk array apparatus |
| 40, 42 | Network switch |
| 74, 76, 80, 82 | HDD |
| 101a, 101b, 101c | Node |
| 103a, 103b, 103c | Operating system |
| 104a, 104b, 104c | Logical volume |
| 105a, 105b, 105c | GNS storage area |
| 106a, 106b, 106c | LNS storage area |
| 102 | Network switch |

The invention claimed is:

1. A cluster type storage system, comprising:

a plurality of nodes coupled to a plurality of clients via a network; and a plurality of disk array apparatuses coupled to each of the nodes, and the each of the nodes is coupled to one another via an internal network, and executes data input/output processing with respect to each of the disk array apparatuses based on an access request from any client among the plurality of clients, wherein the each of the nodes:

comprises a logical volume which is an access target of each of the clients, manage each of the logical volumes in association with a global namespace which is provided to each of the clients as a single namespace common to each of the nodes, and a local namespace provided to each of the clients as a namespace for specifying each of the nodes, manages storage areas of each of the logical volumes by dividing these storage areas into global namespace storage areas representing the access destination if the global namespace has been added to the access request, and into local namespace storage areas representing the access destination if the local namespace has been added to the access request, and take the proportion of the capacity occupied by the global namespace storage area against the overall capacity of each of the logical volumes as an adjustment target, compares a first data-stored capacity in the global namespace storage area in each of the logical volumes with a global namespace capacity threshold which is set for the global namespace storage area, also compares a second data-stored capacity in the local namespace storage area in each of the logical volumes with a local namespace capacity threshold which is set for the local namespace storage area, increases the proportion of the capacity occupied by the global namespace storage area against the overall capacity of each of the logical volumes on condition that the first data-stored capacity exceeds the global namespace capacity threshold and the second data-stored capacity is smaller than the local namespace capacity threshold, and reduces the proportion of the capacity occupied by the global namespace storage area against the overall capacity of each of the logical volumes on condition that the first data-stored capacity is smaller than the global namespace capacity threshold and the second data-stored capacity exceeds the local namespace capacity threshold.

2. The cluster type storage system according to claim 1, wherein each of the nodes:

determines the unused capacity of the global namespace storage area among the logical volumes of each of the nodes if the global namespace has been added to the access request, selects its own logical volume as the access destination designated by the access request and accesses the selected logical volume if the unused capacity of its own logical volume is larger than the unused capacity of logical volume of the other node in this determination, selects the access destination designated by the access request from among the logical volumes belonging to the other node and accesses the selected logical volume via the internal network if the unused capacity of its own logical volume is smaller than the unused capacity of the logical volume of another node in this determination; and selects its own logical volume as the access destination designated by the access request and accesses the selected logical volume if the local namespace has been added to the access request.

3. The cluster type storage system according to claim 1, wherein each of the nodes:

determines the unused capacity of the global namespace storage area among the logical volumes of each of the nodes, selects the access destination designated by the access request from among the logical volumes belonging to any of the nodes in accordance with the determination result, and accesses the selected logical volume if the global namespace has been added to the access request, and selects its own logical volume as the access destination designated by the access request, and accesses the selected logical volume if the local namespace has been added to the access request.

4. The cluster type storage system according to claim 1, wherein each of the nodes adjusts the proportion of the capacity occupied by the global namespace storage area against the overall capacity of each of the logical volumes according to a load change on its own node.

5. The cluster type storage system according to claim 1, wherein each of the nodes:

monitors the first data-stored capacity of the global namespace storage area in each of the logical volumes, the overall capacity of each of the logical volumes, and the proportion of the capacity occupied by the global namespace storage area against the overall capacity of each of the logical volumes, selects a logical volume with small unused capacity of the global namespace storage area as a migration source volume, also selects a logical volume with large unused capacity of the global of the global namespace storage area as a migration destination volume on condition that there is a disparity in the unused capacity of the global namespace storage area between the nodes based on the monitoring results, and transfers data in the selected migration source volume to the selected migration destination volume.

6. A method of controlling a cluster type storage system which comprises a plurality of nodes coupled to a plurality of clients via a network; and a plurality of disk array apparatuses coupled to each of the nodes, the each of the nodes being coupled to one another via an internal network and data input/output processing being executed with respect to each of the disk array apparatuses based on an access request from any client among the plurality of clients, the method comprising:

a step whereby each of the nodes manages each of the logical volumes which is an access targets of each of the clients in association with a global namespace which is provided to each of the clients as a single namespace shared by each of the nodes, and a local namespace which is provided to each of the clients as a namespace for specifying each of the nodes, and manages storage areas of each of the logical volumes by dividing the storage areas into a global namespace storage area presenting the access destination if the global namespace has been added to the access request and into a local namespace storage area presenting the access destination if the local namespace has been added to the access request;

a step whereby which each of the nodes adjusts the proportion of the capacity occupied by the global namespace storage area against the overall capacity of each of the logical volumes, a step whereby each of the nodes compares a first data-stored capacity in the global namespace storage area in each of the logical volumes with a global namespace capacity threshold which is set for the global namespace storage area, and compares a second data-stored capacity in the local namespace storage area in each of the logical volumes with a local namespace capacity threshold which is set for the local namespace storage area;

a step whereby each of the nodes increases the proportion of the capacity occupied by the global namespace storage area against the overall capacity of each of the logical volumes on condition that, based on the comparison results of the above mentioned step, the first data-stored capacity exceeds the global namespace capacity threshold and the second data-stored capacity is smaller than the local namespace capacity threshold; and a step whereby each of the nodes reduces the proportion of the capacity occupied by the global namespace storage area against the overall capacity of each of the logical volumes on condition that, based on the comparison results of the above mentioned step, the first data-stored capacity is smaller than the global namespace capacity threshold and the second data-stored capacity exceeds the local namespace capacity threshold.

7. The method of controlling a cluster type storage system according to claim 6, comprising:

a step whereby each of the nodes determines the unused capacity of the global namespace storage area in the logical volumes of each of the nodes if the global namespace has been added to the access request;

a step whereby each of the nodes selects its own logical volume as the access destination designated by the access request if determined that the unused capacity of its own logical volume is larger than the unused capacity of the logical volume of another node in the determination of the above mentioned step;

a step whereby each of the nodes accesses the logical volume selected in the above mentioned step;

a step whereby each of the nodes selects the access destination designated by the access request from among the logical volumes belonging to the other node if determined that the unused capacity of its own logical volume is smaller than the unused capacity of the logical volume of the other node in the determination of the above mentioned step;

a step whereby each of the nodes accesses the logical volume selected via the internal network in the above mentioned step;

a step whereby each of the nodes selects its own logical volume as the access destination designated by the access request if the local namespace has been added to the access request; and a step whereby each of the nodes accesses the logical volume selected in the above mentioned step.

8. The method of controlling a cluster type storage system according to claim 6, comprising:

a step whereby each of the nodes determines the unused capacity of the global namespace storage area in the logical volumes of each of the nodes if the global namespace has been added to the access request;

a step whereby each of the nodes selects the access destination designated by the access request from among the logical volumes belonging to any of the nodes according to the determination result of the above mentioned step;

a step whereby each of the nodes accesses the logical volume selected in the above mentioned step;

a step whereby each of the nodes selects its own logical volume as the access destination designated by the access request if the local namespace has been added to the access request; and a step whereby each of the nodes accesses the logical volume selected in the above mentioned step.

9. The method of controlling a cluster type storage system according to claim 6, comprising:

a step whereby each of the nodes adjusts the proportion of the capacity occupied by the global namespace storage area against the overall capacity of each of the logical volumes according to a load change of its own node.

10. A method of controlling a cluster type storage system according to claim 6, comprising:

a step whereby each of the nodes monitors the first data-stored capacity of the global namespace storage area in each of the logical volumes, the overall capacity of each of the logical volumes, and the proportion of the capacity occupied by the global namespace storage area against the overall capacity of each of the logical volumes;

a step whereby each of the nodes selects a logical volume with small unused capacity of the global namespace storage area as a migration source volume, and also selects a logical volume with small unused capacity of the global namespace storage area as a migration destination volume on condition that there is a disparity in the unused capacity of the global namespace storage area between the nodes based on the monitoring results; and a step whereby each of the nodes migrates data in the migration source volume selected in the above mentioned step to the selected migration destination volume.

* * * * *